Oct. 12, 1954  B. T. MATTHIAS  2,691,738
ELECTRICAL DEVICE EMBODYING FERROELECTRIC
LANTHANUM-CONTAINING SUBSTANCES
Filed April 8, 1949

BODY CONTAINING
CRYSTALLINE
$LaGaO_3$
OR
$LaAlO_3$

CRYSTAL OF
$LaGaO_3$
OR
$LaAlO_3$

INVENTOR
B. T. MATTHIAS
BY Edwin B. Cave
ATTORNEY

Patented Oct. 12, 1954

2,691,738

UNITED STATES PATENT OFFICE 2,691,738

ELECTRICAL DEVICE EMBODYING FERROELECTRIC LANTHANUM - CONTAINING SUBSTANCES

Bernd T. Matthias, Summit, N. J., assignor to Bell Telephone Laboratories, Incorporated, New York, N. Y., a corporation of New York Application April 8, 1949, Serial No. 86,177

9 Claims. (Cl. 310—8)

1

This invention relates to electrical devices utilizing new ferroelectric bodies.

The invention is based upon the discovery of ferroelectric properties in crystals of the gallates and aluminates of rare earth metals, particularly lanthanum.

Ferroelectricity is a phenomenon associated with the spontaneous polarization of groups of ionic dipoles in the crystal lattice so as to form electrically polarized domains. These domains usually tend to be so arranged within the crystal as substantially to neutralize each other and present no substantial external electrical field.

Application of an electric field to such a crystal, or a body of such crystals, causes growth of those domains having their direction of polarization most nearly aligned with the direction of the applied field, at the expense of the other domains, and also causes some orientation, toward the direction of the field, of the direction of polarization within the domains that remain. The result is an over-all polarization of the crystal, or body of crystals, to which the field is applied. Removal of the applied field results in partial retention of a residual over-all polarization and partial restoration of domains having components of polarization in the reverse direction.

These ferroelectric properties in the lanthanum gallate and aluminate crystals referred to above appear to be associated with the pseudocubic or perovskite crystalline structure possessed by these substances at room temperature. Above a definite temperature a transition of crystalline structure from pseudo-cubic or mimetic to cubic occurs and this temperature may ordinarily be taken as the Curie point for these substances since the ferroelectric effects disappear at higher temperatures.

The Curie temperatures may vary considerably with small amounts of impurities in the crystals. Measurements which have been made on crystals of substantial purity have indicated a Curie temperature of roughly 100° C. for both lanthanum gallate and lanthanum aluminate.

The ferroelectric characteristics of these substances render them adaptable to a number of practical applications. Among these may be mentioned their use as condenser dielectrics, as piezoelectric elements and as electro-optical ele-

2 ments. For these purposes, the lanthanum gallate and aluminate may be used in the form of single crystals or in the form of polycrystalline ceramics as will be discussed below. Referring to the accompanying drawing:

Figure 1:
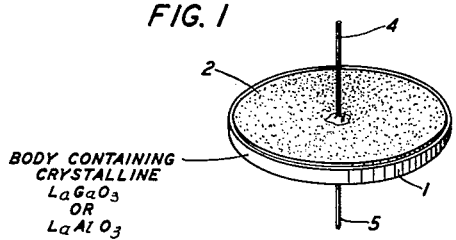
Fig. 1 is a perspective view of an electrical device which is useful as a condenser or as a piezoelectric element and which embodies the ferroelectric substances of the present invention.
Figure 2:
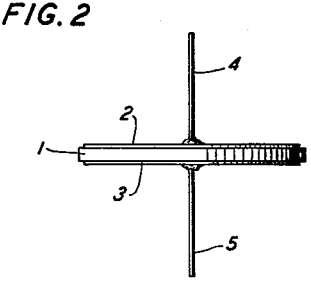
Fig. 2 is a front elevation, in section, of the device of Fig. 1.

In the device shown in Figs. 1 and 2, the novel ferroelectric body of the present invention is shown in the shape of a thin circular disc 1. Adherent metal coatings 2 and 3 formed on the opposite sides of the disc serve as a pair of electrodes. Lead wires 4 and 5 are electrically connected to the electrodes 2 and 3 by suitable means, as by soldering.

Figure 3:
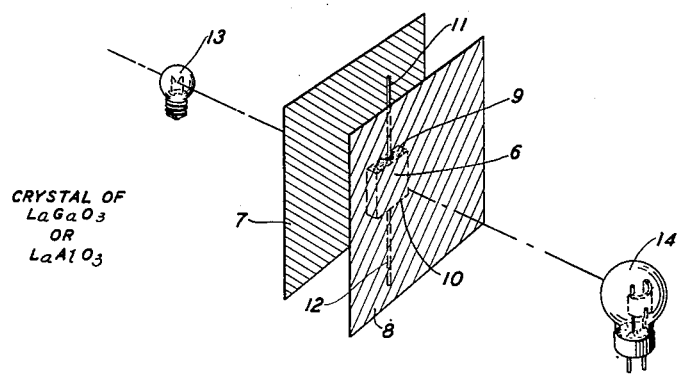
Fig. 3 is a diagrammatic showing, in perspective, of an electro-optical device utilizing a ferroelectric crystal.

In the electro-optical device shown diagrammatically in Fig. 3, a single crystal or crystal section 6 of a ferroelectric substance of the present invention is mounted between crossed polarizing filters 7 and 8. The crystal is provided with metal electrodes 9 and 10 coated on opposite faces, to which lead wires 11 and 12 are electrically connected by any suitable means, as by soldering. A light source 13 and a photosensitive cell 14 are so disposed that the light to which the photosensitive cell is exposed is that which originates at the light source and passes successively through polarizing filter 7, crystal 6 and polarizing filter 8. Since the degree of rotation of the plane of polarized light passing through the crystal 6 is dependent upon the voltage impressed across the electrodes 9 and 10, the amount of light originating in the light source 13 and passing through the polarizing filters and crystal to the photosensitive cell 14 can be varied by varying the voltage applied to the electrodes.

The device shown in Figs. 1 and 2 may serve, when properly utilized, as an electric condenser or as a piezoelectric device. When used as an electric condenser, the device makes use of the extremely high dielectric constant which is exhibited by ferroelectric substances by reason of their high reversible polarizability.

This high dielectric constant increases with increasing temperature in the vicinity of the Curie point, reaching a maximum at the Curie temperature and walling off at higher temperatures. Values obtained for the dielectric constants of the ferroelectric substances of the present invention by measurements on single crystals are as follows:

|  | Dielectric Constant at Room Temperature | Dielectric Constant at Curie Temperature |
|---|---|---|
| Lanthanum gallate | 15 | 250 |
| Lanthanum aluminate | 15 | 700 |

Since the dielectric constant is decreased by a direct-current bias across the dielectric, the device of Figs. 1 and 2, when used as a condenser, is preferably operated without an externally applied direct-current bias and without a residual polarization resulting from prior exposure of the dielectric to a higher potential gradient than that under which it is intended to operate.

When the device shown in Figs. 1 and 2 is used as a piezoelectric element it is operated while subjected to a constant direct-current biasing field. When subjected to such a field at a temperature below the Curie point, the body 1 exhibits piezoelectric properties in that it changes in physical size in response to changes of a potential applied across the body in a direction having a component parallel to the direction of the biasing field, and in that, when subjected to mechanical stress, it generates a potential, in the direction of the biasing field, which varies with variations in the applied stress. The effectiveness of the piezoelectric element increases as the superimposed direct-current field is increased.

The direct-current biasing field for piezoelectric use may be established by maintaining a direct-current voltage across the electrodes 2 and 3 while the device is in use. A similar result can be achieved by subjecting the ferroelectric body to a high direct-current potential gradient for a substantial period of time prior to use. Upon removal of this direct-current potential, a residual polarization remains in the body which can be used as the source of the requisite direct-current field without the use of an externally applied direct-current potential. The residual polarization may be obtained more effectively if the body is heated to a temperature above the Curie temperature and is then allowed to cool to room temperature under a high-direct-current potential gradient.

A substantial residual polarization may be established on the body at room temperature by the application of a potential gradient of between about 20,000 volts per centimeter and about 5,000 volts per centimeter for a minimum period of time falling between about a few minutes at the high voltage and 1 to 3 hours at the lower voltage. Similar potential gradients may be used where the body is polarized by cooling it from above the Curie point while the potential is applied. With the latter polarization procedure the time for which the potential is applied is not important.

The device of Figs. 1 and 2, when operated with an adequate direct-current bias either externally applied or resulting from remanent polarization in the body 1, may be used for any of the known piezoelectric purposes. Thus it may be used in the usual manner as a frequency control device or as an electro-mechanical filter, the alternating-current voltage being applied across the leads 4 and 5 and the external direct-current biasing voltage, if any, being applied across the same leads. A suitable externally applied direct-current biasing gradient may be between about 1,000 volts per centimeter and 20,000 volts per centimeter.

The device may also be used in the usual manner as an electromechanical transducer where it is desired to convert variations of electrical current or potential into corresponding mechanical variations, or vice versa, as in supersonic sound generators, microphones, telephone receivers, phonograph pick-ups, piezoelectric relays and similar devices. In such devices, the usual mechanical means are supplied for either transmitting mechanical energy to the body 1, as in microphones and phonograph pick-ups, or utilizing the mechanical energy generated in the body, as in supersonic generators, telephone receivers and relays.

As mentioned above, the body 1 of Figs. 1 and 2 may be formed of the ferroelectric substance in the form of a single crystal or crystal section or in the form of a coherent polycrystalline body, such as a ceramic body prepared by sintering together finely divided particles of the ferroelectric crystals. The body 6 of Fig. 3, however, cannot be made up of a disordered arrangement of finely divided crystals as in a polycrystalline ceramic, but must be used in the form of one or more single crystals or crystal sections. Crystals having a size of the order of 1 to 2 millimeters or somewhat larger are adequate for this purpose.

One method by which crystals of the ferroelectric substances of the present invention have been prepared is by reacting lanthanum oxide or lanthanum chloride with gallium oxide or aluminum oxide in the molten state in a flux such as sodium fluoride, potassium fluoride, or borax, cooling the mass to room temperature and dissolving away the flux with water so as to leave the substantially insoluble ferroelectric crystals.

Thus, crystals of lanthanum gallate ($LaGaO_3$) were grown by mixing stoichiometric amounts of $La_2O_3$ and $Ga_2O_3$ with an equal weight of a flux consisting of sodium fluoride, heating at about 1400° C. for about 3 hours and then cooling to room temperature at a rate in the vicinity of about 100° C. per hour. Crystals of lanthanum gallate were also prepared by a similar procedure in which borax was used as the flux.

Lanthanum gallate crystals were also prepared by reacting a fused mixture of $Ga_2O_3$ with greater than stoichiometric proportions of $LaCl_3$, cooling to room temperature and dissolving out the water-soluble products. A similar reaction was carried out using $LaCl_3 \cdot 7H_2O$ together with two mols of ammonium chloride per mol of the lanthanum chloride.

Crystals of lanthanum aluminate ($LaAlO_3$) were prepared by the processes set forth above with $Al_2O_3$ substituted for the $Ga_2O_3$.

Crystals of the other rare earth metal gallates and aluminates prepared by analogous methods have lower Curie points than the corresponding lanthanum compounds, and ferroelectric bodies formed from such crystals may be used for the purposes of the present invention under special conditions of operation where they are maintained at temperatures below their Curie points.

They are also useful where it is desired to lower the Curie points of ferroelectric crystals of other substances by the formation of mixed crystals, as will be discussed below.

Ceramic bodies may be prepared by grinding the crystals of ferroelectric substances, prepared as above, to a finely divided state, mixing the finely divided substance with a small amount of a temporary binder, pressing the mixture into the desired shape, and firing the pressed body at a temperature sufficient to volatilize any binder present and to sinter the particles so as to form a compact ceramic mass. Any suitable temporary binder may be used such as water or a wax, such as "Halowax" (chlorinated naphthalene), or a heat depolymerizable resin, such as polymethyl methacrylate. The wax or resin may be added to the finely divided crystalline substance in the form of a solution in a volatile organic solvent, which is subsequently allowed to evaporate leaving the binder in the mass. From about 3 per cent to about 6 per cent of the binder, based on the weight of the remainder of the mass, is ordinarily adequate.

The mixture of the finely divided ferroelectric substance and the binder is preferably pressed into shape at a high pressure of the order of several tons per square inch. In the absence of any substantial amount of a flux, the firing of the pressed body may be carried out at from about 1300° C. to about 1500° C. for from 1 to 2 hours or more. Preferably, a small amount, up to about 5 per cent, of a flux or a mineralizer, such as finely divided boric oxide, borax, magnesium fluoride or calcium fluoride is incorporated in the mixture before pressing and the firing is carried out at a slightly lower temperature.

The crystals entering into the devices of the present invention, whether they are used in the form of monocrystalline bodies or polycrystalline bodies, have been described above as prepared from a single compound from the group of lanthanum aluminate and lanthanum gallate or, more broadly, from a single rare earth metal gallate or rare earth metal aluminate. It is often desirable to form these crystals of a mixture of two or more of these substances, both substances entering into the same crystal lattice. Similarly, it may also be desirable to form the crystals of a mixture of one or more of the above substances with one or more of some other ferroelectric substance capable of entering into the same crystal lattice such as sodium metacolumbate, potassium metacolumbate, sodium metatantalate, potassium metatantalate or barium titanate. The ferroelectric crystals produced in this manner will have Curie temperatures lying between the Curie temperatures of crystals of the single components.

It may be desirable to form mixed crystals in which a small amount of lanthanum ferrate or of another rare earth metal ferrate is present. Because of the high conductivity of the ferrates, the amount present should be limited to not more than about 10 per cent of the total substance entering into the crystal. It may also be desirable to form mixed crystals containing lead titanate or any other substance having the perovskite structure. If the added substances are not themselves ferroelectric, or if they have ferroelectric properties only at temperatures so far below or above room temperature as to be non-ferroelectric for all practical purposes, it is desirable that the amount added be limited to not more than about 10 per cent by weight so as not to dilute the ferroelectric properties of the body unduly.

These mixed crystals may be formed in the same manner as described above, except that stoichiometric amounts of the oxide components of the compounds to be added are incorporated in the melt along with the original components. In the preparation of polycrystalline bodies, in place of forming crystals of several components, it may sometimes be desirable to prepare the bodies from a mixture of finely divided ferroelectric crystals of more than one substance, each individual crystal particle being formed of a single compound.

The devices of the present invention have been described as made up essentially of a pair of electrodes spaced by a coherent body of one or more ferroelectric crystals. These devices may be manufactured according to the techniques known in the art for the manufacture of analogous devices embodying other ferroelectric crystal bodies. The best results are obtained when the electrodes consist of an adherent conductive coating formed directly on the ferroelectric body, as by the application of a conventional silver paste, which is later fired to produce an adherent durable solid conductive coating, or by applying a sprayed or evaporated metal layer.

It may obviously be desirable to form the devices of the present invention with more than two electrodes in some instances. When the ferroelectric body is a polycrystalline substance, it may obviously be readily formed into various shapes other than those shown in the drawings. Thus, it may be formed in the shape of a tube having an internal metal coating and an external metal coating as electrodes or it may be formed as an annular ring having suitably disposed electrodes.

The invention has been described above in terms of its specific embodiments and since modifications and equivalents will be apparent to those skilled in the art, the description is intended to be illustrative of, and not a limitation upon, the scope of the invention.

What is claimed is:

1. An electric device comprising two conducting electrodes spaced by a ferroelectric body comprising a ceramic of sintered finely divided crystalline particles of a substance selected from the group consisting of lanthanum gallate and lanthanum aluminate.

2. An electric device comprising a ferroelectric body formed of a substance in crystalline form selected from the group consisting of lanthanum gallate and lanthanum aluminate and a pair of conducting electrodes in the form of an adherent metal coating formed on said body.

3. An electric condenser comprising a pair of conducting electrodes spaced by a ferroelectric body comprising a ceramic of sintered finely divided crystalline particles containing a substance selected from the group consisting of lanthanum gallate and lanthanum aluminate.

4. A piezoelectric device comprising a pair of conducting electrodes spaced by a ferroelectric body comprising a substance in crystalline form selected from the group consisting of lanthanum gallate and lanthanum aluminate, said body having a substantial over-all electrical polarization.

5. An electric device comprising two conducting electrodes having therebetween a ferroelectric body comprising a substance in crystalline form selected from the group consisting of lanthanum gallate and lanthanum aluminate.

6. A piezoelectric device comprising a ceramic body of sintered crystalline particles of a substance selected from the group consisting of lanthanum gallate and lanthanum aluminate and a pair of conducting electrodes, each in the form of an adherent metal coating, formed on said body, said body having a substantial over-all electrical polarization.

7. A device as described in claim 6 wherein the ceramic body is formed of lanthanum gallate.

8. A device as described in claim 6 wherein the ceramic body is formed of lanthanum aluminate.

9. An electric device comprising a single crystal of a substance selected from the group consisting of lanthanum gallate and lathanum aluminate and two conducting electrodes on the surface of said crystal.

References Cited in the file of this patent

UNITED STATES PATENTS

| Number | Name | Date |
|---|---|---|
| 1,694,661 | Meissner | Dec. 11, 1928 |
| 2,024,737 | Klingsporn | Dec. 17, 1935 |
| 2,064,289 | Cady | Dec. 15, 1936 |
| 2,398,088 | Ehlers et al. | Apr. 9, 1946 |
| 2,413,184 | Lande | Dec. 24, 1946 |
| 2,432,250 | Rath | Dec. 9, 1947 |
| 2,467,325 | Mason | Apr. 12, 1949 |
| 2,484,636 | Mason | Oct. 11, 1949 |
| 2,486,560 | Gray | Nov. 1, 1949 |
| 2,493,200 | Land | Jan. 3, 1950 |
| 2,554,324 | Chambers | May 22, 1951 |
| 2,554,332 | Jaffe | May 22, 1951 |

OTHER REFERENCES

Wartenberg et al.: "Z. anorg. allgem. chem.," vol. 207, pages 1–20, (1932); cited from Chem. Abstracts, vol. 26, column 5239.

Kroger, Elsevier Publ. Co., N. Y. C. (1948); cited from Chem. Abstracts, vol. 43, columns 3722, 3723 (1949).

Introduction to the Rarer Elements, Browning, Wiley, 1914, pages 62–63.